United States Patent [19]

Zakich

[11] Patent Number: 5,091,124
[45] Date of Patent: Feb. 25, 1992

[54] HIGH TONNAGE RIM PRESS

[75] Inventor: Paul Zakich, Akron, Ohio

[73] Assignee: The Dow Chemical Company, Midland, Mich.

[21] Appl. No.: 643,874

[22] Filed: Jan. 22, 1991

Related U.S. Application Data

[60] Division of Ser. No. 502,087, Mar. 30, 1990, Continuation-in-part of Ser. No. 318,574, Mar. 3, 1989, Pat. No. 4,944,669.

[51] Int. Cl.$^5$ .................. B29C 45/66; B29C 45/80
[52] U.S. Cl. .................. 264/40.1; 264/328.6; 425/150; 425/411; 425/451; 425/575; 425/589; 425/595
[58] Field of Search .................. 264/40.1, 40.2, 40.5, 264/328.1, 328.2, 328.6; 425/150, 411, 450.1, 451.2, 451.9, 575, 589, 590, 589, 569, 451

[56] References Cited

U.S. PATENT DOCUMENTS

| 2,711,561 | 6/1985 | Studli | 425/149 |
| 2,916,768 | 12/1959 | Quere et al. | 425/451.2 |
| 3,120,039 | 2/1964 | Stübbe et al. | 425/DIG. 223 |
| 4,247,278 | 1/1981 | Descrovi et al. | 425/408 |
| 4,304,540 | 12/1981 | Hammon | 425/451.9 |
| 4,318,682 | 3/1982 | Larson et al. | 425/411 |

FOREIGN PATENT DOCUMENTS

| 2295832 | 7/1976 | France | 425/595 |
| 2128541 | 5/1984 | United Kingdom . | |

Primary Examiner—Willard E. Hoag
Attorney, Agent, or Firm—Michael S. Jenkins

[57] ABSTRACT

A high tonnage reaction injection molding (RIM) press has fixed and movable platens for clamping a composite mold therebetween at a closed mold position. A plurality of high pressure hydraulic cylinders are mounted on a carrier for the movable platen, and a locking mechanism having a plurality of incrementally spaced locking positions is effective to lock the carrier selectively at said positions. A pair of low power hydraulic piston-cylinder assemblies connected with the carrier adjacent to its opposite ends move the carrier and movable platen to the closed position. Short stroke connecting rods operated by the high pressure cylinders are forced independently of each other into high tonnage engagement with the movable platen at a plurality of locations within the area of the composite mold to clamp the latter between the platens and positively seal its junctions, whereupon a RIM mix head injects the high pressure reactive chemicals into the sealed mold.

Sensor means including a pair of sensors associated with said pair of low power assemblies sense deviations of said opposite ends from a reference plane and cooperate with the associated low power assemblies to maintain the carrier at a predetermined attitude with respect to said plane as the carrier moves to said closed position. The sensor means also sense the distance that the carrier must be moved from the closed position to the next successive locking position, then in sequence, actuate said low pressure assemblies to move said carrier to said next successive locking position, thereby to provide space between said carrier and movable platen, actuate a spacer to span said space and prevent its closure during successive press operations, actuate said high pressure cylinders to clamp the mold between said platens, and finally actuate a RIM mix head to inject the high pressure reactive chemicals into said mold.

24 Claims, 8 Drawing Sheets

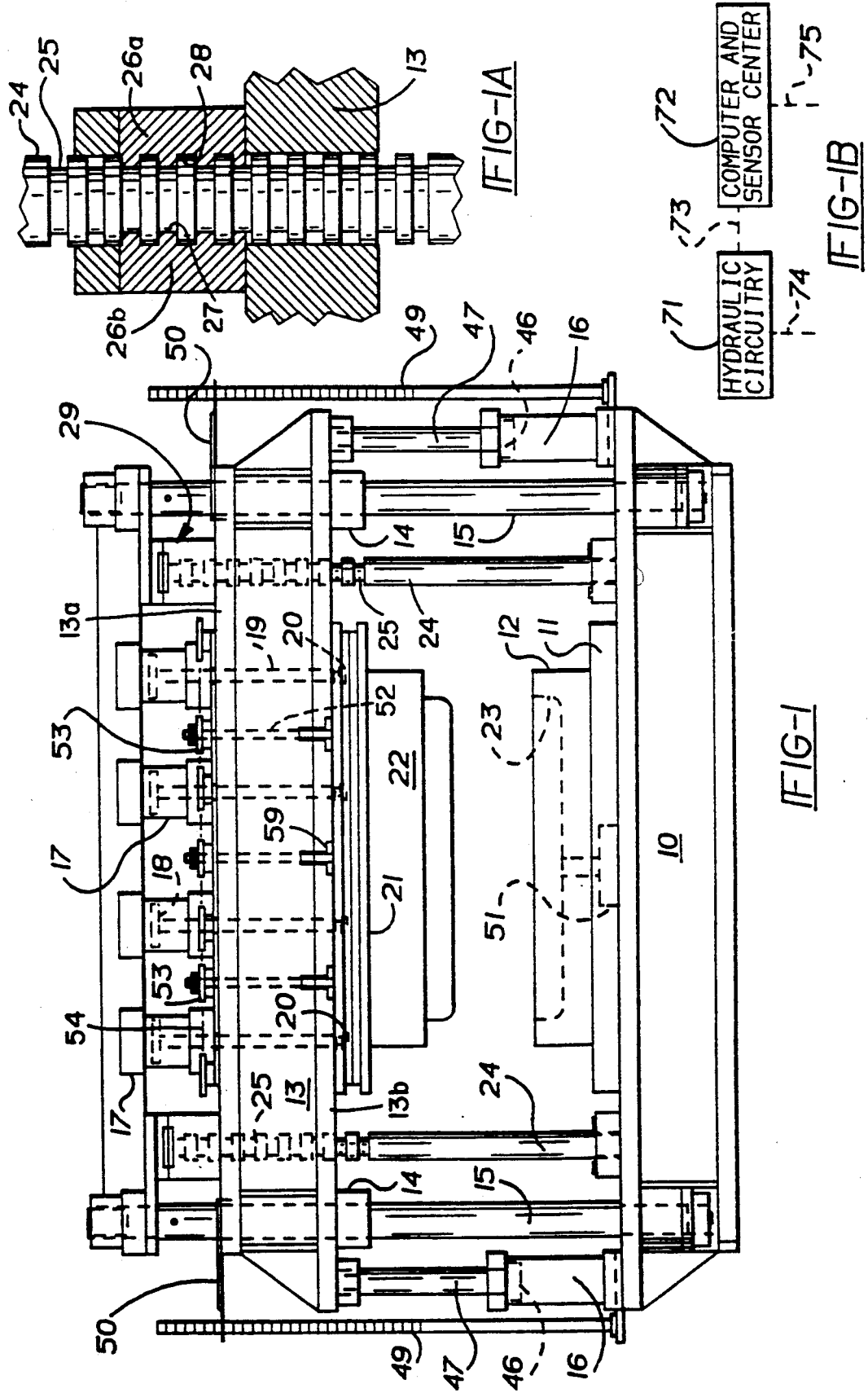

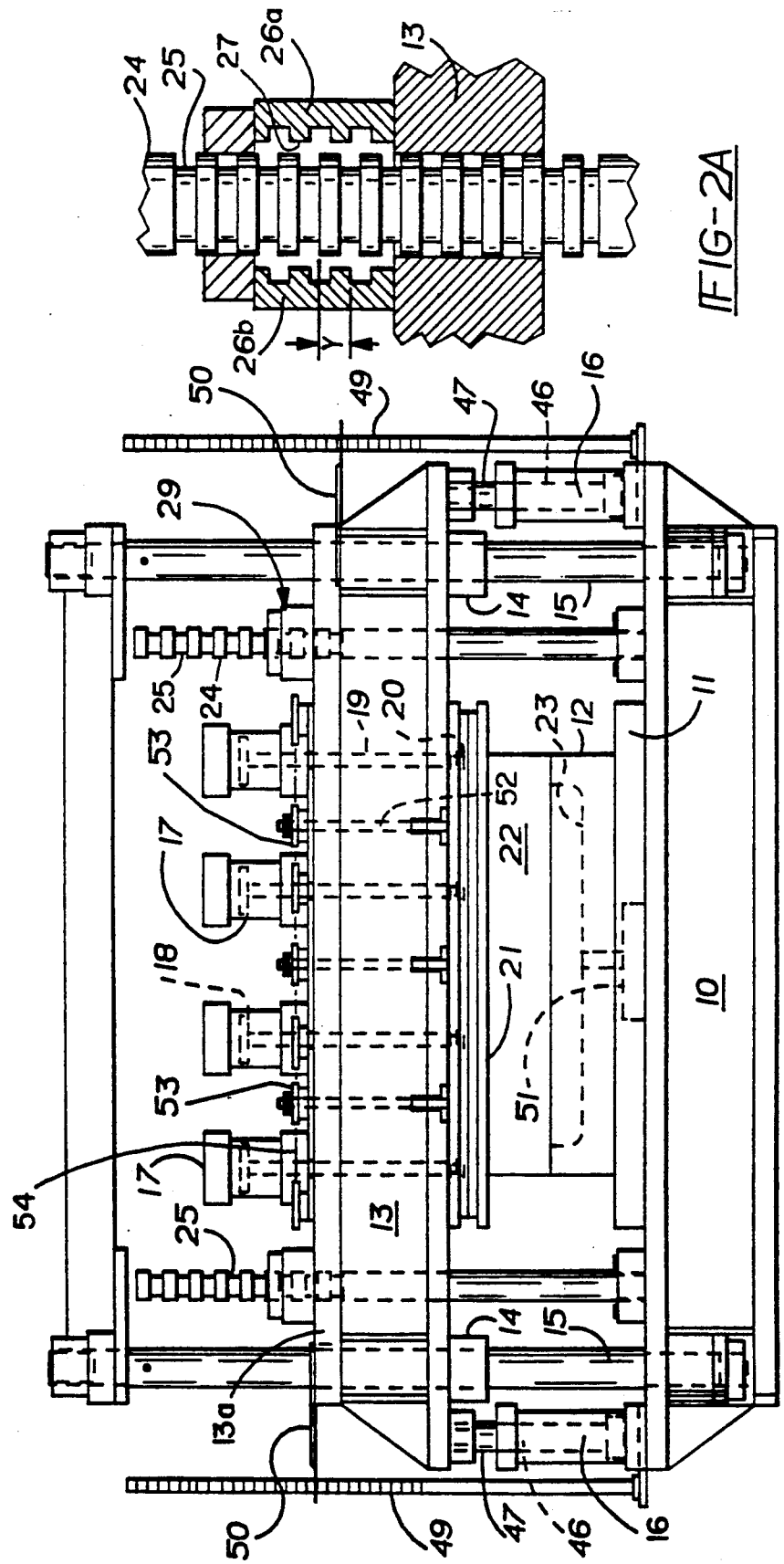

HIGH TONNAGE RIM PRESS

This application is a division of application Ser. No. 502,087, filed Mar. 30, 1990 and is a Continuation-In-Part of co-pending U.S. application Ser. No. 07/318,574, filed Mar. 3, 1989, and now U.S. Pat. No. 4,944,669 issued 7-31 1990, and is concerned with an imporved press which, though not limited to any specific size or use, is particularly suitable for the reaction injection molding (RIM) of large products requiring high pressure in a range of 500 to 1000 tons or more over a mold area of 50 square feet or more.

BACKGROUND OF THE INVENTION

In the typical RIM operation, a mold cavity formed by at least two mating mold parts is filled with reactive chemicals that are mixed and injected at high pressure into the mold cavity, wherein an exothermic polymerization reaction substantially increases the pressure within the cavity. During the reaction process, it is important to clamp the mold parts firmly together to prevent the material being molded from escaping at the junctures between the mold parts. The RIM of large products requires tremendous compression forces over a comparatively large area, such that conventional presses used for high tonnage RIM operations tend to warp or deform during the molding process. Although the press beds between which comparatively large mold parts are pressed comprise heavy rigid steel structures, it has not been economically feasible to provide such presses that will not deform. In consequence, the force applied to clamp the mold parts together is distributed unevenly over the area of the mold, enabling the extrusion of pressurized reacting chemicals through tiny spacings at the mold junctures. Such spacings on the order of a thousandth of an inch are significant, may result in improperly formed molded products, and in any event necessitate an additional operation to remove flash from the molded product.

Some RIM molds are characterized by a female mold part having a deep cavity that cooperates with a male mold part having projections that extend deeply, i.e., as much as 30 inches or more, into the cavity when the mold parts are brought together to interfit at a mold closed position. The mold cavity is usually defined by highly polished and accurately machined surfaces. Accordingly, not only must the junctures between the mold parts at their parting surfaces be tightly sealed during the high pressure molding process, but each part of such molds must be orientated precisely with respect to a common reference plane, which is usually horizontal when the mold parts move vertically between their open and closed mold positions. If the supporting structure for either mold part becomes tilted slightly from the reference plane, the projections of the male mold part that extend deeply into the female cavity might contact and damage the mold and in any event, will alter and possibly cause a defective molded part. It is accordingly essential to successful operation with such RIM molds that the supports for the mold remain precisely parallel to the reference plane as the mold parts approach the mold closed position.

Although the prior art relating to molding presses is extensive, very little of that art known to applicant is concerned with the problem of preventing or compensating for deformation of the press components. The patent to Hammon, U.S. Pat. No. 4,304,540, is typical of a conventional type of press that ignores the deformation problem and is thus limited to the molding of small products involving comparatively low pressure applications. The Hammon press is concerned with the SCM industry (sheet moulding compounds) wherein extrusion of fluid high pressure chemicals from the mold seams is not an important problem. In the SCM operation, material such as a sheet or blank to be formed is placed on a lower open die part and thereafter shaped by a high tonnage forming operation that requires several inches of relative travel of upper and lower die parts toward each other.

Hammon provides stress or clamping rods 18 mounted at the corners of fixed and movable press beds or mold supports 12 and 24 respectively. A locking assembly 22 carried by the movable bed 24 clamps the serrations 21 of each rod 18 to lock the movable bed 24 adjacent to a forming or "reference" position prior to application of the high tonnage forming pressure. Thereafter pressure is applied to the upper sides of pistons 57, FIG. 1, which are secured to the rod 18 to pull the latter and bed 24 downwardly in a forming operation. After the forming operation, pressure is applied to the lower ends of pistons 57 to effect a stripping action by pushing the rods 18 upwardly.

Such a press is suitable for use only with comparatively small molds because under extremely high tonnage force, in addition to deformation of other press components, the locking rods 18 are stretched, usually non-uniformly. Although the corner portions of the beds 12 and 24 are tightly clamped together, their central portions, when subjected to the high tonnage molding conditions of a RIM process, are insufficiently clamped to the extent that the high pressure reactive chemicals being molded extrude from the mold as flashing.

The patents to Quere et al, U.S. Pat. No. 2,916,768 and Larson et al, 4,318,682, recognize the problem of deformation and the possibility of improperly aligned press components. Quere '768, for example, provides for independent adjustment of the corner mounted stress rods 5 and for the use of different pressures in the actuating cylinders 3 to compensate for such deformation. Such a mold requires sophisticated controls and at best can only minimize deformation when the press is used with comparatively small molds. Even if the clamping forces at the corners of the mold are equalized, the mold will still be subject to the disadvantages of the corner mounted clamping devices used by Hammon.

The Larson et al patent makes an attempt to compensate for deformation of press components by distributing the high pressure cylinders 38 over the area of the mold. The patent also discloses the use of replaceable spacer shims 66 engageable with stop 64 to predetermine the spacing between the fixed support 18 and movable platen 16 at its lowermost position, whereby the locking plates 80, 80' properly engage one of the slots in 60. However the structures disclosed are inadequate for RIM applications and are unrelated to the concept of the invention disclosed herein.

Typically, of SMC presses, the lowermost position of Larson's platen 16 is not comparable to the closed position of a RIM type press. Instead, it is equivalent to Hammon's "reference" position wherein the movable platen is locked in a position that determines the start of the high tonnage forming operation. The high tonnage platen must then move several inches at high pressure beyond the "reference" position to form the sheet or plate between the dies, column 3, lines 30-34 of Larson et al.

Larson's upper platen 16 in effect becomes a fixed platen after it is moved to and locked at its "reference" or lowermost position which determines the beginning of the sheet forming operation. High tonnage force and appreciable hydraulic power must then be applied by the cylinders 38 to move the lower platen 14 upwardly in a forming operation against the fixed platen 16. The mold parts of a RIM press on the other hand are moved by comparatively low power means to a closed position in contact with each other. Thereafter, high tonnage force is only required to hold the mold closed sufficiently tightly during the molding operation to prevent extrusion of the pressurized chemicals from within the mold. Inasmuch as the mold in a RIM operation is already closed when the high tonnage pressure is applied, only a minuscule amount of high pressure hydraulic fluid is required to hold the mold closed.

Another type of press known to the art and concerned with the provision of a uniform distribution of molding force over the area of a mold is variously known as a bladder or pillow type press. Such presses provide a high pressure chamber having a movable and usually deformable wall coextensive with a movable mold plate and deformable against the latter to clamp it toward a fixed mold plate during a molding operation. Typically, high speed means are also provided for moving the movable plate and high pressure chamber in unison to and from a mold closed position whereat the movable mold plate is adjacent to the fixed mold plate and in position to carry out the molding operation upon the injection of pressurized fluid into the high pressure chamber. Such presses are only suitable for molding products having comparatively small surface areas requiring a comparatively small total molding force, wherein deformation of the press components is not a problem and high pressure stripping is not required. The deformable wall of the high pressure chamber can only exert a unidirectional molding force and is thus not suitable for high pressure stripping.

A typical pillow or bladder type press is disclosed in the Descrovi et al U.S. Pat. No. 4,247,278, which recognizes the problem of deformation of the mold plates and provides a fluid pressurized cylinder 77 having an axial end wall 76, FIGS. 1, 2, or 216, FIGS. 3, 4, sufficiently thin and flexible to conform to deformation of an adjacent mold plate when the cylinder 77 is pressurized during a molding operation. Descrovi et al, like other pillow or bladder type patents, is not suitable for high tonnage operation. At the outset, it does not enable high pressure stripping by the same pressure exerting system that provides the mold closing pressure. Also, the area of the deformable walls 76 and 216 must be strictly limited. Otherwise these walls will be ruptured if subjected to the high pressure RIM of a large product. The deformable wall must be sufficiently thin to conform to deflection of the adjacent mold carrier and must be sufficiently thick to prevent its destruction within cylinder 77. Accordingly bladder or pillow type presses such as Descrovi et al must be operated within a comparatively limited range of clamping pressure.

SUMMARY OF THE INVENTION

The present invention is concerned with the problems resulting from the distortion of press components during high tonnage RIM operations involving large molds and provides an effective combination and arrangement of press components including a pair of mold supporting platens movable with respect to each other to a mold closed position for clamping a composite mold or die therebetween, as for example a multiple part mold for RIM, and also including an improved arrangement of sensors and transducers that materially simplify the press operation and reduce the cycle time of repetitive operations.

In a preferred construction, a movable platen carried by a heavy and sturdy movable bolster or carrier is rapidly moved by a high speed and comparatively low power hydraulic mechanism from an open mold position to a closed mold position confronting a fixed platen supported by a heavy and sturdy fixed base. At the mold closed position, the two platens are confined between the movable carrier and fixed base, and cooperating mold parts confined between and supported by the two platens interfit conventionally along parting surfaces to define a closed mold cavity therebetween. The fixed base also supports several guide pillars and locking rods that extend slidably through the carrier in the direction of its movement. The pillars guide movement of the carrier to and from the open and closed mold positions. The locking rods provide a plurality of closely and uniformly spaced annular locking grooves or serrations selectively engagable with locking dogs mounted on the carrier to lock the latter at incremental positions against movement with respect to the fixed base and platen.

Depending upon the dimensions of the cooperating mold parts between the platens at the mold closed position, the locking dogs mounted on the carrier may not be properly aligned with the serrations of the locking rods to lock therewith when the carrier moves initially to the closed mold position. In order to lock the carrier positively with respect to the fixed base, it may be necessary to move the carrier and locking dogs carried thereby a fraction of the incremental spacing between successive serrations of the locking rods. To this end, when the carrier stops at the closed mold position, a transducer and sensor carried by the fixed base and carrier cooperate to determine the distance "Y" that the carrier must be moved from the closed mold position to the next successive locking position, and also to initiate a sequence of press operations as follows:

(1) The low power hydraulic mechanism is activated to move the carrier independently of the movable platen from the closed position to the next successive locking position, i.e., the distance "Y" determined by the sensor. During this sensor determined movement of the carrier to a locking position, the movable and fixed platens remain at the mold closed position. In consequence, a space equal to the sensor determined distance "Y" is created between the carrier and the movable platen.

(2) The locking dogs and a spacer mechanism are then actuated, whereupon the locking dogs engage the aligned serrations of the locking rods and lock the carrier against further movement. Essentially simultaneously, the spacer mechanism moves a spacer into position to span the space "Y" created between the carrier and the movable platen.

(3) Thereafter, a high tonnage force exerting mechanism mounted on the locked carrier forces the movable platen against the fixed platen, thereby to seal the parting surfaces between the mold parts.

(4) The RIM apparatus is then actuated to inject the reactive chemicals into the sealed mold cavity in a conventional manner.

(5) Upon completion of the molding operation, the carrier is unlocked and returned with the movable platen to the initial mold open position by the high speed hydraulic apparatus to enable repetition of the cycle.

The spacer inserted by the spacer mechanism between the carrier and the movable platen remains in place until it is removed at the election of the press operator, as for example to accommodate a mold of a different dimension. Thus, during successive molding cycles, when the carrier moves the movable platen to the mold closed position, the carrier will already be spaced from the movable platen by the aforesaid sensor determined distance, such that the locking dogs will be properly aligned with the locking rods for immediately locking the carrier against movement during the RIM operation. Operation of the press is thus materially simplified and the cycle time for repetitive molding operations is appreciably shortened.

The high tonnage force exerting means preferably comprise a plurality of high pressure piston-cylinder assemblies mounted on the carrier and having their piston rods or connectors separately extensible independently of each other in the direction from the carrier toward the movable platen and connected thereto at a corresponding plurality of separate locations confined within the area of the mold that is clamped between the two platens. The connectors are arranged so that when they are extended, each independently of the others, they force the movable platen against the fixed platen at the closed mold position.

In the event that some of the press components tend to deform during a high tonnage clamping operation, such that the junctures between the mold parts clamped between the platens are not tightly sealed, the independently extensible connector connected to the movable platen adjacent to any unsealed juncture will continue its clamping movement until the junctures between the parting surfaces of the mold parts are completely sealed.

The locking rods when engaged by the locking dogs sustain the entire reaction force of a high tonnage clamping operation, such that the guide rods are unaffected by the clamping operation and their function in guiding movement of the carrier is not hampered. Also the guide and locking rods are located outwardly of the area of the platens, such that the mechanism for operating the locking dogs may also be located outside of that area. Thus the force exerting means, preferably high pressure cylinders, may be mounted on the carrier as closely together as desired within that area.

Also preferably a pair of locking dogs associated with each locking rod are slidably supported on the carrier for moving simultaneously in opposite directions to and from positions of locking engagement with the locking rod. A first spring interposed between fixed portions of the carrier and one of the dogs of said pair yieldingly urges the one dog to its position of locking engagement. A second spring interposed between fixed portions of the carrier and the other dog of said pair yieldingly urges the other dog to its position of locking engagement. A pair of force exerting members connected respectively with the dogs are movable simultaneously in said opposite directions to move the dogs simultaneously to their positions of locking engagement against the reaction of the springs. Also preferably a pair of spacers are provided for engaging portions of each dog and the carrier for blocking unlocking movement of the dogs at a predetermined limiting position.

The locking dogs slidable on the carrier are necessarily substantial in size and weight in order to withstand the high tonnage clamping force when interlocked with the locking rods. As a result, appreciable sliding friction would ordinarily exist between the locking dogs and carrier when the dogs are moved to and from locking engagement with the locking rods. In order to reduce such sliding friction, a resilient device is interposed between the carrier and dogs to elevate the latter yieldingly two or three thousandths of an inch from the carrier. The annular grooves of the locking rods also provide approximately an eighth of an inch clearance for the locking dogs, such that the elevated dogs are freely received within the grooves when aligned for locking engagement therewith. During high tonnage clamping, the clamping force readily overrides the resilient device and eliminates any clearance between the dogs and carrier.

The preferred high pressure cylinder and piston assemblies described herein also provide compact and readily controlled reversible means for effecting high pressure stripping where such is required, utilizing the same pressure source required for the high tonnage clamping. However other force exerting assemblies known to the art, such as toggle or electro-mechanical assemblies by way of example may be substituted for the high pressure cylinder-piston assemblies. Also, although the present invention is described herein in application with high tonnage RIM of large products, such as polyurethane parts and the like, the press described may be used in other applications where a plurality of independently extensible force exerting connecting rods are required to apply force at a corresponding plurality of separate closely spaced locations within the area of a mold.

Other advantages and applications of the present invention will be apparent from the following description and appended claims, reference being had to the accompanying drawings forming a part of this specification wherein like reference characters designate corresponding parts in the several views.

BRIEF DESCRIPTION OF THE DRAWINGS

FIG. 1 is a schematic elevational view of a RIM press embodying the present invention, showing the press at its mold open position, as for example at the beginning of a molding cycle.

FIG. 1A is an enlarged fragmentary schematic view illustrating the relation between the locking rods and dogs associated with the FIG. 1 position.

FIG. 1B is a schematic representation of the press control center comprising the interacting hydraulic and sensor systems.

FIGS. 2 and 2A are similar to FIGS. 1 and 1A, but show the press elements at the initial mold closed position.

FIGS. 4 and 4A are views similar to FIGS. 1 and 1A, showing the spacer mechanism in position to assure that the carrier will always be at the FIG. 3 locking position during repetitive molding operations when the mold parts are at their closed position.

Figures 3, 3A:
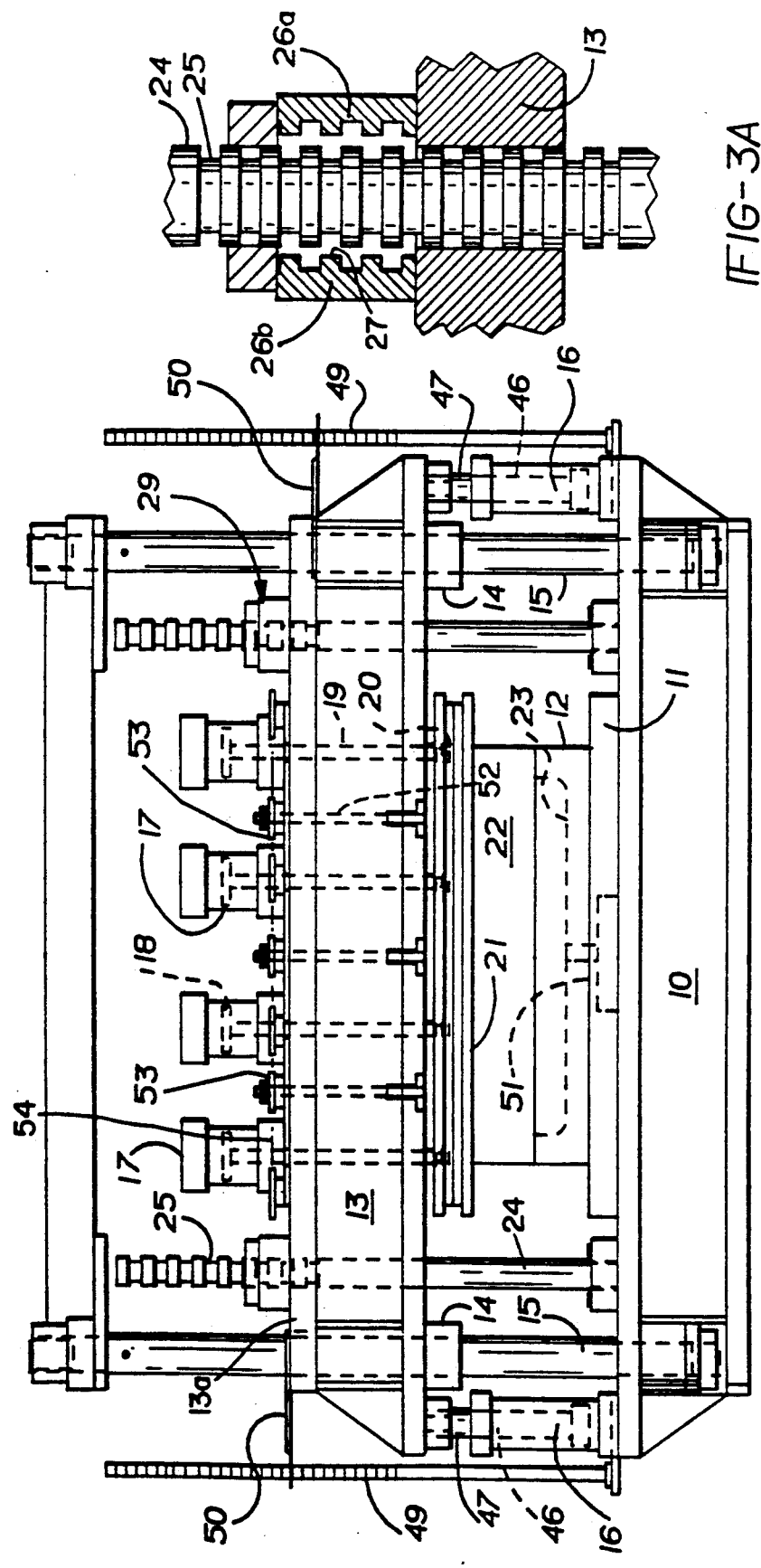
FIGS. 3 and 3A are views similar to FIGS. 1 and 1A, showing the press components after the carrier has been moved to the locking position and prior to activation of the spacer mechanism.

It is to be understood that the invention is not limited in its application to the specific details described herein, since the invention is capable of other embodiments and of being practiced or carried out in various ways, and that the phraseology or terminology employed herein is for the purpose of describing the invention claimed in the appended claims.

DESCRIPTION OF A PREFERRED EMBODIMENT OF THE INVENTION

Referring to the drawings, a high pressure press for reaction injection molding (RIM) on the order of 500 to 1000 tons or more capacity is illustrated comprising in the present instance a rigid fixed base 10 supporting and secured to a lower fixed mold platen 11. A lower fixed mold part 12 is supported and conventionally secured to the platen 11. A movable carrier or bolster 13 of rigid material is provided with elongated sleeve bushings 14 that ride along four guide pillars 15 extending vertically from mountings on the base 10 adjacent to its corners and outwardly of the platen 11. A pair of comparatively high speed hydraulic assemblies including cylinders 16 mounted on the midline of the base 10 engage endwise extensions of the carrier 13 for rapidly moving the latter along the guides 15 between an elevated open position, FIG. 1, and a lower closed position, FIGS. 2, 3, and 4, as described below.

Figure 6:
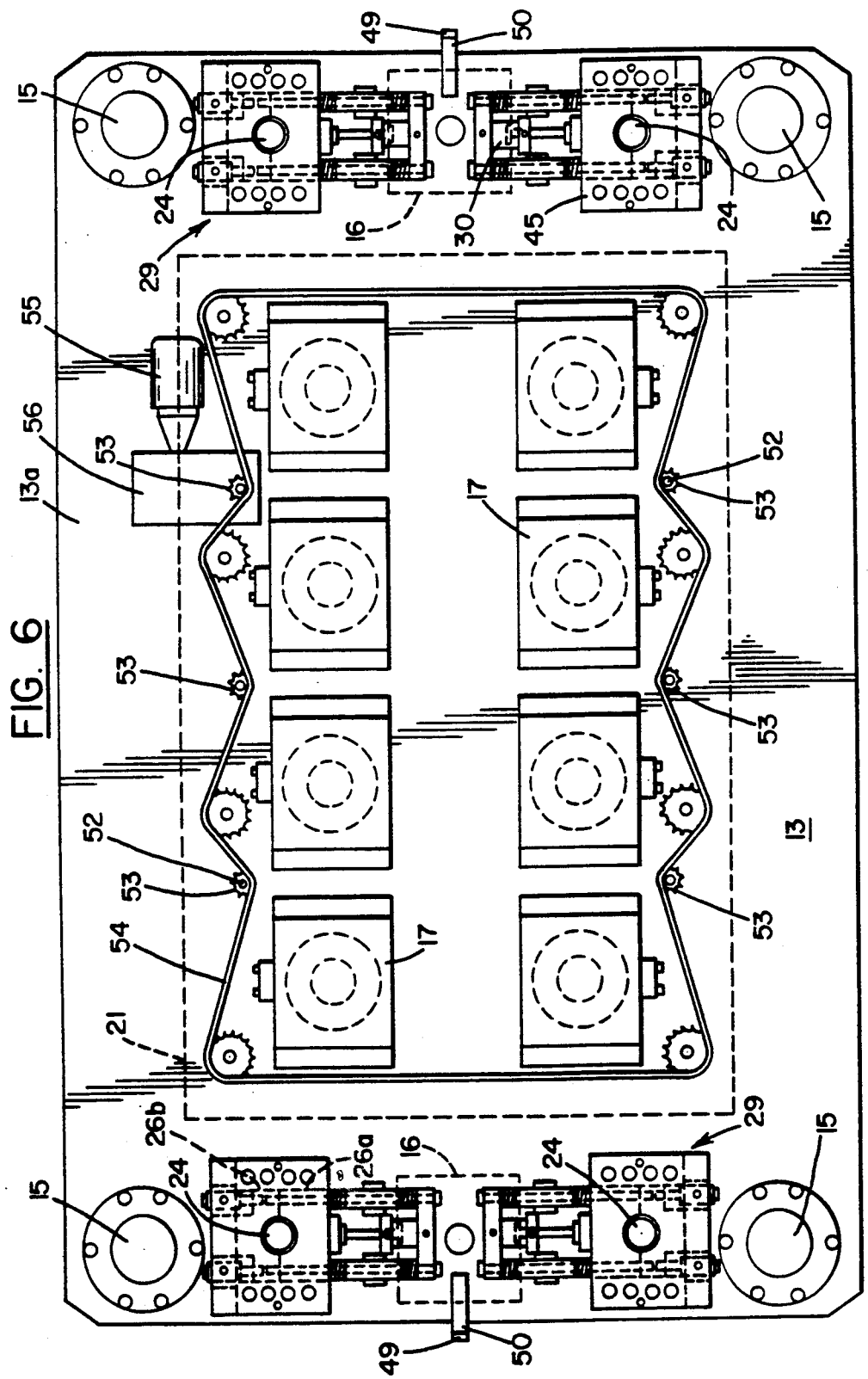
FIG. 6 is a schematic plan view of the press.

Mounted on the upper surface of the carrier 13 are a plurality of high pressure hydraulic cylinders 17, eight in the present instance, FIG. 6. Each cylinder 17 contains a bidirectionally operated piston 18 connected with a vertically movable connecting rod or connector 19 that extends in sliding sealing relationship through the lower end of the associated cylinder 17 and freely through the carrier 13 to a connection 20 at its lower end with a movable upper platen 21 for supporting the latter and urging it vertically in high pressure clamping, and stripping operations when required, upon actuation of the pistons 18. The platen 21 of rigid material is essentially coextensive with the underlying platen 11. An upper movable mold part 22, conventionally secured to the platen 21 overlies and cooperates with the lower mold part 12 at the closed position of the press, FIG. 2, to define a mold cavity 23 therebetween, which necessarily must be sealed during a molding operation. By virtue of the press structure described, including the cylinders 17 mounted above the carrier 13, the bushings 14 may be elongated appreciably to provide the desired support for the carrier 13 on the pillar 15.

Also mounted on the base 10 adjacent to and slightly inwardly of the guide pillars 15 respectively, FIG. 6, are four vertical locking rods 24 that extend freely through the carrier 13 and provide uniformly spaced annular grooves or serrations 25 throughout their upper portions, FIGS. 1A to 4A. The parts described thus far may be formed from sturdy structural steel alloys. The cylinders 16 and 17 are connected in an operative hydraulic circuit, schematically illustrated in FIG. 1B and both may be operated by the same source of high pressure hydraulic fluid.

Figure 7:
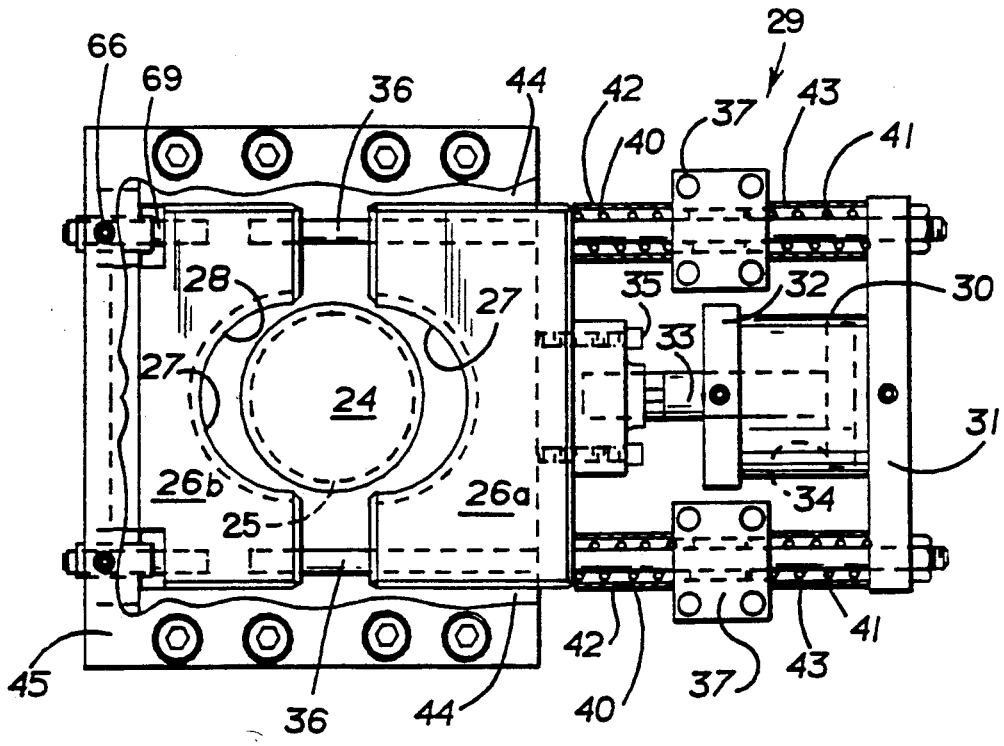
FIGS. 7 and 8 are plane views of the locking mechanism, showing the latter in the unlocked and locked position respectively.
Figure 8:
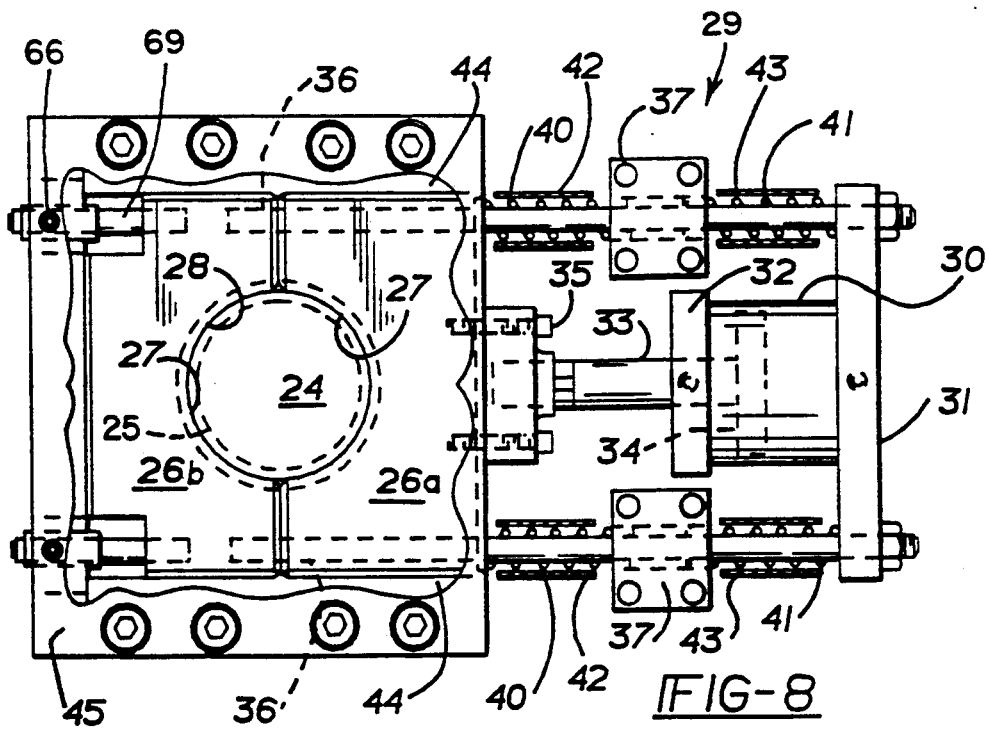

Associated with each rod 24 is a locking mechanism comprising a pair of locking dogs 26a, 26b, FIGS. 7 and 8, mounted on the upper surface of carrier 13 for horizontal movement toward and from opposite sides of the associated rod 24. The dogs 26a,b are provided with semicylindrical recesses 27 serrated at 28 to mate and interlock with the associated rods 24, FIG. 8. Movement of each pair of dogs 26a,b to and from the locking position is accomplished by an associated spring assisted hydraulic mechanism indicated generally at 29 and comprising a horizontally movable hydraulic cylinder 30. The latter is closed at its outer end and secured thereat integrally to a horizontal transverse bar 31. The cylinder 30 is also closed at its inner end and secured thereat integrally to a guide 32 for a piston rod 33 connected to a piston 34 reciprocable within the cylinder 30. The rod 33 extends horizontally from the piston 34 and perpendicularly to both the transverse bar 31 and the associated rod 24 and also slideably through the guide 32 in sealing relationship to a connection 35 at its inner end with the adjacent dog 26a.

A pair of rods 36 parallel to the rod 33 are connected with the other dog 26b at opposite sides of the rod 24 and extend outwardly in guided sliding relationship through the dog 26a and a pair of fixed guides 37 respectively and then to screw threaded ends secured to the opposite ends of the bar 31 by nuts 39. The guides 37 are secured to the carrier 13. Extending around the rods 36 are a pair of helical springs 40, compressible between the dog 26a and fixed guides 37, and a second pair of helical springs 41 compressible between the guides 37 and bar 31. The piston-cylinder assembly 29 is selectively operated by hydraulic circuitry for applying hydraulic pressure to either the left or right face of piston 34.

When pressure is applied to the left face of piston 34, the latter is moved to the FIG. 7 position at the limit of its rightward movement within cylinder 30, thereby to move the dog 26a rightward to the FIG. 7 position and out of engagement with the rod 24. Simultaneously the cylinder 30 and connected bars 31 and 32 are moved leftward, thereby to move the rods 36 leftward and to force the dog 26b leftward out of engagement with the rod 24, FIG. 7. The simultaneous rightward movement of dog 26a and leftward movement of bar 31 compresses the springs 40 and 41 respectively between the dog 26a and guides 37 and between guides 37 and bar 31. Thus each dog 26a and 26b moves away from the locking rod 24 to the FIG. 7 unlocked position by an amount equal to one-half the total stroke or relative movement between the piston 34 and its cylinder 30, i.e., the piston 34 and cylinder 30 each move a half stroke in opposite directions relative to the fixed supports 37.

In order to assure the half stroke movement of the cylinder 30 and piston 34, a pair of tubular spacers 42 and 43 of equal lengths enclose respectively each pair of springs 40 and 41 and are located respectively between the guides 37 and dog 26a and between the guides 37 and bar 31. The tubular spacers 42 and 43 closely space the fixed guides 37 equal distances from the adjacent portions of the dog 26a and bar 31 when the mechanism 29 is at the FIG. 7 unlocked position. At the FIG. 6 locked position, the spacers 42, 43 float on their respective springs 40, 41.

Upon application of pressure to the right face of piston 34, or preferably upon release of pressure within cylinder 30, the compressed springs 40 move the dog 26a leftward to the locked position, FIG. 8, and the compressed springs 41 move the bar 31 and connected dog 26b rightward to the locked position, whereat the interfitting serrations 25, 28 of the rod 24 and dogs 26a,b lock the carrier 13 against movement longitudinally of the rod 24. The locking mechanism described is fail safe in the event of loss of pressure. In addition to the guides 37 secured to the carrier 13, a pair of fixed guides 44 secured to the carrier 13 in parallelism with the rods 36 engage opposite sides of the dogs 26a,b in sliding guided relationship to enable their horizontal movements to and from their locking positions as described.

Vertical movement of the dogs 26a,b independently of the carrier 13 is limited by a plate 45 that overlies and is secured to the fixed guides 44. The locking rod 24 passes freely through an opening in the plate 45, and the plate 45 overlies the dogs 26a,b with a small vertical clearance, such that the dogs slide between the guides 44 to which the plate 45 is secured. The vertical dimension of each dog 26a,b will be seven or eight inches for a 1000 ton press in order to provide the strength to withstand the high tonnage clamping force in the locked position. Accordingly a second pair of rods 36 and similar associated structure preferably overlie the rods 36, FIG. 9.

Figure 9:
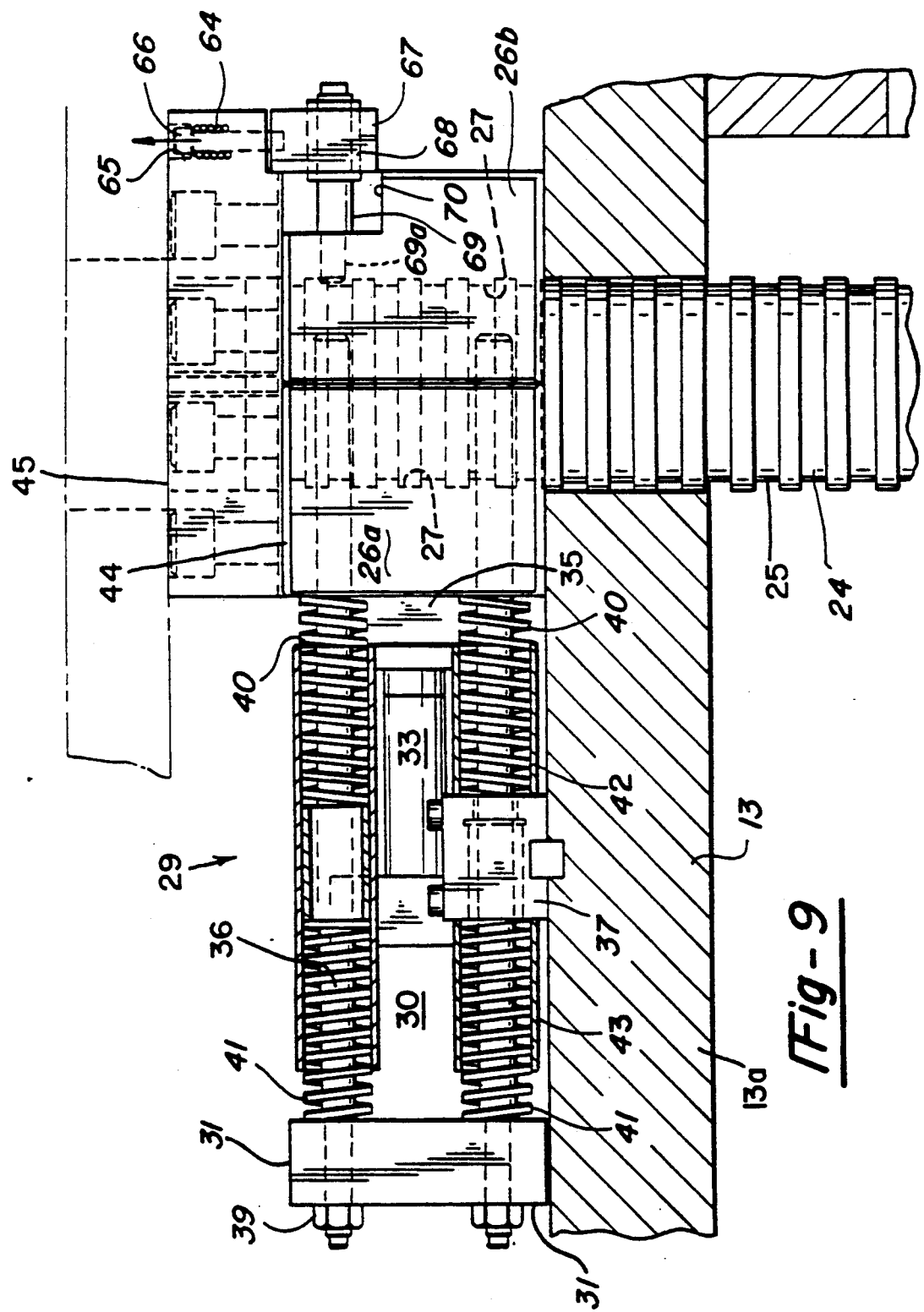
FIG. 9 is a fragmentary elevation of FIG. 8, showing details of the resilient device for elevating the locking dogs to reduce friction during movement to and from their locking positions.

In order to minimize the sliding friction and resulting wear between the carrier 13 and dogs 26a,b when the latter are moved to and from locking engagement with the rod 24, the weight of the dogs 26a,b in each mechanism 29 is supported by a pair of helical springs 64 seated within a pair of recesses 65 in the plate 45 and coiled around a pair of large headed bearing support screws 66, FIG. 9. Each screw 66 extends vertically downward from the associated recess 65 and slidable through the plate 45 to a screw connection at its lower threaded end with a bearing block 67. The latter contains a horizontal cylindrical sleeve bearing 68 for a pin 69 slidable coaxially within the bearing 68. A threaded end 69a of the pin 69 screws into the adjacent dog 26b at a location essentially in coaxial alignment with the uppermost rod 36 and is thus secured to the dog 26b for movement therewith to and from the locking position. During such movement, the pin 69 slides coaxially within the bearing 68. The dog 26b is recessed at 70 to accommodate the bearing block 67 when the dog 26b is moved out of contact with the rod 24, FIG. 7.

The spring 64 is under compression between the base of the recess 65 and the enlarged head of the screw 66 and normally holds the pin 66 and connected block 67 and dog 26b upwardly to the extent of a few thousandths of an inch clearance between the upper surface of the block 67 and the overlying cover plate 45. By reason of the rods 36 connected to the dog 26b and extending through the dog 26a, the latter is also elevated, such that both dogs 26a,b normally clear the upper surface of the carrier 13 by a few thousandths of an inch. To this end, the supports 37 permit sufficient vertical movement of the rods 36 to enable the resiliently induced clearance between the dogs 26a,b and carrier 13. Likewise, approximately an eighth of an inch clearance is provided for the projections of the serrated dogs 26a,b within the mating annular grooves of the serrated rods 24. When the press is in the high tonnage clamping mode, the clamping force overrides the springs 64 and the dogs 26a,b seat solidly on the carrier 13.

In accordance with a typical operation of the RIM press, starting by way of example from an elevated or mold open position of the carrier 13, FIG. 1, with the pistons 46 and rods 47 of the cylinders 16 extended essentially to their limits of upward movement, the dogs 26a,b interlocked with the locking rods 24, FIG. 1A, and the pistons 18 retracted upwardly to support the movable platen 21 at its upper limit of movement against the carrier 13, the locking assemblies 29 may then be operated as described to release the dogs 26a,b from the serrated rods 24. The hydraulic fluid pressure within cylinders 16 is suitably controlled by hydraulic circuits, FIG. 1B, to effect rapid downward movement of the heavy carrier 13 and platen 21 toward the closed position, FIG. 2. Shortly before the carrier 13 reaches the FIG. 2 closed position, whereat the mold parts 12 and 22 interfit with each other in mating relationship to define a closed mold cavity 23, the rate of descent is retarded to allow the mold parts 12, 22 to come together gently. The initial closing movement of the carrier 13 may be controlled either manually or by the sensing system described below.

Inasmuch as the mating mold parts 12, 22 may be replaced by other mold parts of different sizes for different molding operations, the serrated rods 24 at the initial closed position may not interfit with the serrated dogs 26a,b, FIG. 2A. Accordingly, before actuation of the locking mechanisms 29, the carrier 13 must be raised to the next successive locking position, FIGS. 3, 3A, whereat the dogs 26a,b interfit in locking engagement with the rods 24. During this operation, the platen 21 and mold part 22 will remain at the closed FIG. 2 position. In consequence, a space 48 will be created between the carrier 13 and platen 21 amounting usually to less than an inch, but not more than the spacing between successive locking positions.

Figure 4:
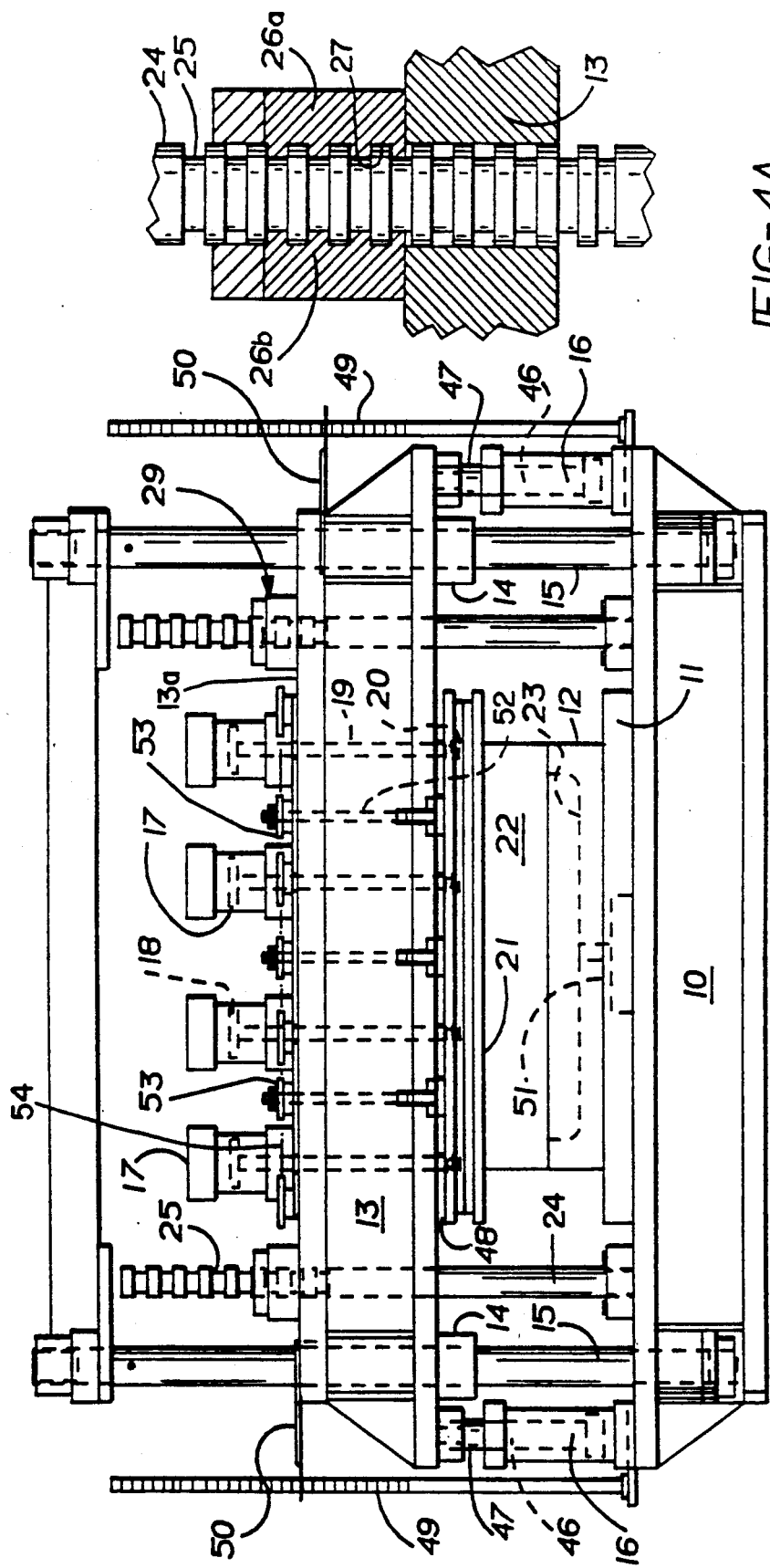

In order to move the carrier 13 precisely and rapidly to the FIG. 3 locking position, a pair of linear displacement transducers 49 are supported by the base 10 in parallelism with the locking rods 24 and on the midline of the press adjacent to its opposite ends. Each transducer 49 is associated with a sensor 50 mounted on the carrier 13. Each sensor 50 and associated transducer 49 may be conventional and connected in an operative sensing circuit 72 cooperable with the hydraulic circuit 71 to enable the sensor 50 to determine and control its position along the length of the transducer 49.

The locking rods 24 are accurately adjusted on the base 10 so that each locking mechanism 29 will engage and lock with its associated rod 24 at precisely the same distance from the base 10 when the carrier 13 is at the FIG. 1 open position. As a result, the carrier 13 at the open position will be perfectly parallel with the base 10. When the circuitry, FIG. 1B, is activated to initiate downward movement of the carrier 13 toward the FIG. 2 closed position, the sensors 50 in cooperation with the transducers 49 will sense their positions along the length of their associated transducers 49 to assure that opposite ends of the carrier 13 are always equidistant from the base 10.

If one of the sensors 50 should detect that it is a trifle lower than the other, the hydraulic system 16 associated with the lower sensor 50 will reduce the rate of downward movement of the lower end of the carrier 13. In consequence, equal distances of both sensors 50 from a horizontal reference plane, i.e., the horrizontal base 10, is maintained within an accuracy of a thousandth of an inch and the desired attitude or horizontal orientation of the carrier 13 is assured throughout its movement to the closed position.

When the carrier 13 approaches the FIG. 2 closed position, the sensors 50 sense that condition and signal the hydraulic circuit 71 to retard the rate of downward travel of the carrier 13. When the movable mold part 22 finally seats on the fixed mold part 12 at the interfitting closed position, downward movement of the carrier 13 stops, and the hydraulic circuit signals the sensors 50 to determine the distance "Y", FIG. 2A, that the carrier 13 must be raised to a locking position, FIG. 3A, whereat the dogs 26a,b can interlock with the rods 24. Successive locking positions are spaced vertically along the locking rod by increments on the order of magnitude of about one to one and a quarter inch. The distance "Y" will be a fraction of such an increment.

The sensor 50 in cooperation with the transducer 49 immediately senses the distance "Y" and initiates a sequence of signals whereby the hydraulic circuit associated with cylinders 17 enables pistons 18 to float and cylinder 16 is actuated to elevate the carrier 13 an amount equal to the distance "Y" whereat the projections of the dogs 26a,b align centrally with the grooves of the rods 24 with approximately an eighth inch clearance. As soon as the carrier 13 is raised the distance "Y" to the next successive locking position, the locking mechanisms 29 are activated to move the dogs 26a,b into locking engagement with the rods 24. Essentially simultaneously, a spacer mechanism is activated to fill the space 48, amounting to the distance "Y", between the carrier 13 and movable platen 21, as described below.

As soon as the carrier 13 is locked against movement by the mechanism 29, the high pressure cylinders 17 are actuated to force the pistons 18 and connecting rods 19 downward against the platen 21, thereby to clamp the mold parts 12, 22 together and effect a sealed mold cavity 23 therebetween, whereupon a conventional RIM mix head 51, FIG. 1, is actuated to discharge reactive chemicals at high pressure into the cavity 23 to enable completion of the RIM operation as is conventional. Inasmuch as the mold parts 12, 22 are in contact at their mold closed position, the high tonnage clamping force is only applied to effectively seal the junctures between the mold parts 12, 22. The travel of the pistons 18 and connecting rods 19 will thus be miniscule, i.e., primarily as required to compensate for unavoidable warpage of the press components, and the hydraulic power required for the high tonnage clamping force will be nominal.

Figure 5:
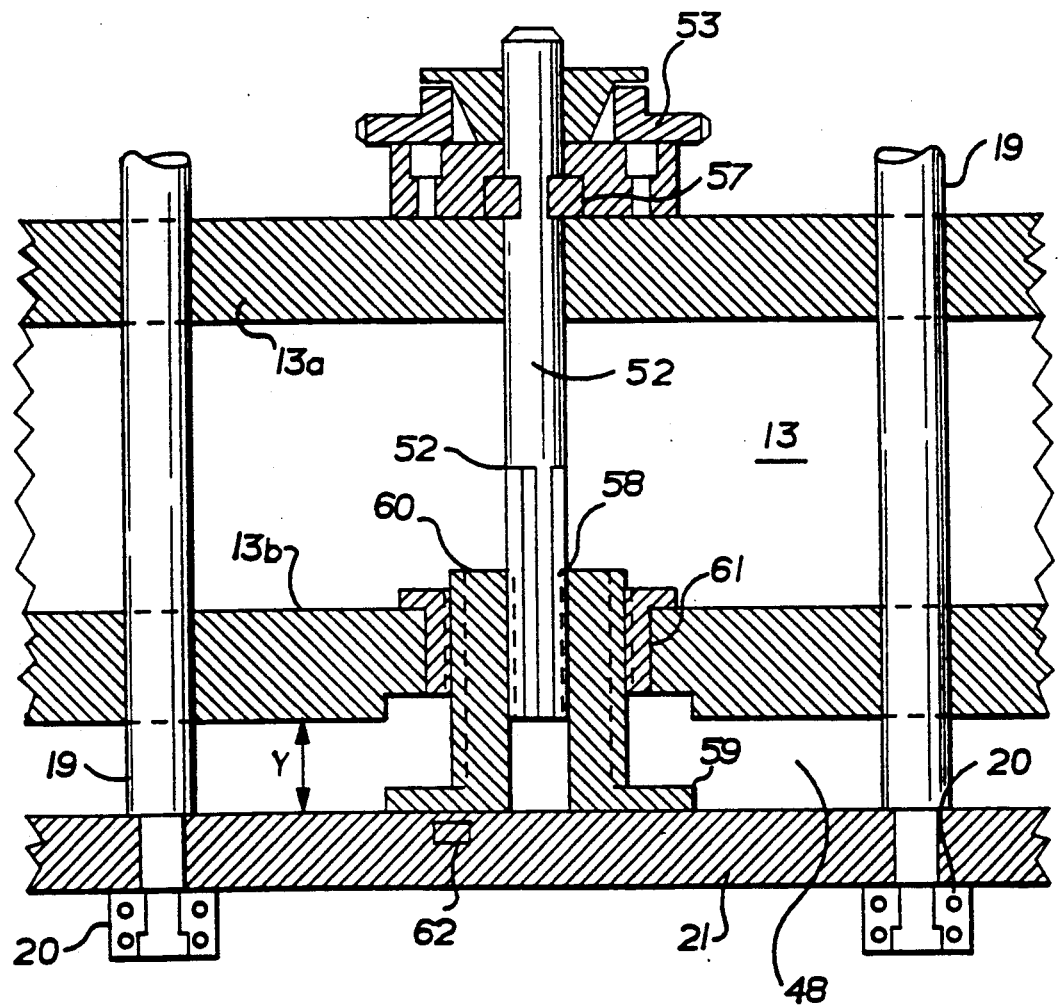
FIG. 5 is an enlarged fragmentary view similar to FIG. 4 showing details of the spacer mechanism.

In the present instance the spacer mechanism comprises six rotatable spindles 52 driven by torque limiting sprockets 53 and sprocket chain 54, FIGS. 5 and 6. The chain 54 in turn is driven by motor 55 through a speed reducer 56. As illustrated in FIG. 6, the chain 54 extends continuously around the six sprockets 53 and suitable idle rollers. Each sprocket 53 is keyed at 57 to a spindle 52 to rotate the same. Each spindle 52 extends vertically and rotatably through a flange 13a of the carrier 13 to a lower longitudinally splined end 58. A cylindrical spacer 59 is splined on the end 58 to rotate with the spindle 52 and also to move axially along the spline. The upper portion 60 of the spacer 59 has a reduced diameter externally threaded portion in screw threaded engagement with an internally threaded non-rotatable portion of carrier 13 or sleeve 61 secured within a lower flange 13b of the carrier 13.

Upon rotation of the spindle 52, the spacer 59 splined thereto also rotates and is driven downward by the screw threaded engagement with sleeve 61 until the enlarged lower end of the spacer 59 strikes the upper surface of platen 21 and actuates a proximity switch 62 secured within the platen 21. By reason of a torque limiting coupling between the sprocket 53 and spindle 52, the spacer 59 and spindle 52 stop rotating. When the proximity switches 62 associated with all six of the spacers 59 have been actuated, a signal is sent to stop motor 55.

During subsequent molding operations, when the press is actuated to move the carrier 13 and movable platen 21 to the closed FIG. 2 position from the open FIG. 1 position, the carrier 13 will already be at a locking position. Accordingly, the process of sensing the distance "Y", raising the carrier 13 to the next successive locking position, and actuation of the above described spacer mechanism will be eliminated. The sensor 50 will recognize that the distance "Y" equals zero and will immediately cause the control center 71, 72 to actuate the locking mechanism 29 to lock the carrier 13 against further movement, then initiate the high tonnage clamping operation of cylinders 17, and thereafter initiate operation of the mix head 51 to inject the pressurized reactive chemicals into the mold cavity 23.

Upon completion of the RIM, the carrier 13 is unlocked from the rods 24 and the high pressure differential across the pistons 18 may be reversed to effect high tonnage stripping, where required, to move the platen 21 slightly upwardly to strip the mold part 22 from the molded product within the mold cavity 23. Usually, the stripping force is less than the 1000 ton molding force, as for example in the neighborhood of 200 tons. Preferably, when high stripping force is not required, as for example when less than 200 tons, the rods 24 may be unlocked from the dogs 26a,b after the RIM operation and the cylinders 16 will be activated to effect the stripping. The stripping and subsequent return of the carrier 13 to the FIG. 1 open position will be under the above described sensor control to maintain the horizontal attitude of the carrier as required to prevent damage to a mold having a deep mold cavity. Uniform and simultaneous stripping movement of all parts of the plate 21 is thus facilitated because it is easier to control the stripping operation and high speed movement of the carrier 13 between the open and closed positions by means of the two cylinders 16 than the eight or more cylinder 17.

As noted above, a major problem confronted by high tonnage RIM presses results from deformation of the press components during the high pressure clamping force required to overcome the reaction pressure of the molding products. The present invention mounts the high tonnage pressure exerting cylinders 17 on the carrier 13 at preselected locations spaced within an area coextensive with the area of the mold 23, FIG. 6, such that at least some of the connectors 19 engage the platen 21 within that area. The connectors 19 are forced independently of each other against the platen 21 by the high pressure fluid within the cylinders 17. Thus any localized unsealed juncture between the mold parts 12, 22 resulting from deformation of the press components, such as bowing of the carrier 13 and base 10, or relative cocking therebetween resulting from the clamping force on the corner mounted locking rods 24, or their non-uniform stretching, and from pressure within the mold 23, will be closed by additional downward movement of the connecting rod 19 overlying the unsealed juncture.

The high tonnage downward extension of each rod 19 continues until all the junctures between the mold parts 12, 22 are compacted firmly together and sealed. The mold parts 12, 22 are necessarily sufficiently strong to resist being crushed by the forces exerted by the high pressure assemblies 17, 18, 19, which forces may amount to approximately 125 tons at each cylinder 17 when the force of a 1000 ton press is distributed among eight rods 19. The condition whereat the mold parts 12, 22 are pressed together sufficiently to positively seal the mold cavity 23 determines the limit of downward movement of the connecting rods 19. The pressure within the cylinders 17 is then maintained to hold the mold cavity 23 closed until completion of the molding reaction, whereupon the press components are returned to the starting position.

The press may operate at pressures in the cylinders 17 on the order of magnitude of 2500 psi for example, wherein the plan area of the mold parts 12, 20, FIG. 6, may be on the order of magnitude of 6 feet by 9 feet by way of example. The spacing between the connections 20 of the connectors 19 with the platen 21 will be determined by the rigidity of the platen 21, but in any event will be sufficiently small so that the leverage of localized deforming forces exerted on the mold platens 11 and 21 between the locations 20 will be too small to enable significant deformation of these plates between adjacent regions 20. It is accordingly apparent that the independently extensible connectors 19 not only compensate for deformation of the press components, they may actually suppress deformation by preventing initial buckling of such parts as the platens 11 and 21. Even when the four locking rods 24 do not stretch identically, or in the event of slight deformation of the heavy base 10, the action of the independently extensible rods 19 described above will maintain the mold 23 closed and sealed throughout the molding operation.

The specific hydraulic sensor and electrical circuitry associated with the cylinders 16, 17 and 30, sensors 49, 50 and 62, and motor 55 required to operate the press mechanism as described, forms no part of this invention because such elements and their operation and control are well known to the art. Accordingly, the hydraulic circuitry or system 71, including proportionate flow control valves for maintaining the controlled horizontal descent of the carrier 13 to the FIG. mold closed position, and computer and sensor center 72 interconnected at 73 for transmission of operating signals therebetween is illustrated schematically in FIG. 1B, wherein 74 schematically represents the hydraulic conduits operatively connecting cylinders 16, 17, 30 with their hydraulic sources and 75 schematically represents the circuits operatively connecting sensors 49, 50, 62 and motor 55 with their power sources and computer control for effecting the operating sequences described above.

I claim:

1. A high pressure press comprising a pair of platens movable with respect to each other between open and closed positions, each platen supporting at least one of multiple mold parts capable of interfitting when said platens are forced toward each other at said closed position to define a mold having a mold cavity sealed at the junctures of the interfitting mold parts, a carrier associated with one of said platens for moving therewith to said closed position, locking means for locking said carrier at a plurality of locking positions spaced incrementally from said closed position, said carrier also being movable to the next successive locking position independently of said one platen at said closed position, force exerting means mounted on said carrier for forcing said one platen toward the other platen when said platens are at said closed position and said carrier is locked at said next successive locking position comprising a plurality of connectors extensible independently of each other in the direction from said carrier toward said one platen for pressing thereagainst at a plurality of separate locations within the area of said mold when the latter is clamped between said platens, thereby to seal said cavity at said junctures, and means for injecting molding chemicals into said sealed cavity.

2. A press according to claim 1, and means independent of said force exerting means for rapidly moving said platens to said closed position.

3. A press according to claim 2, said one and other platen comprising a movable platen and a fixed platen respectively, said means for rapidly moving said platens comprising hydraulic pressure actuated means, and said force exerting means comprising a plurality of cylinders mounted on said carrier, said connectors comprising connecting rods secured to hydraulically actuated pistons reciprocable in said cylinders, said rods extending from said cylinders and slidably through said carrier to connections with said movable platen at said locations, each connector being extensible in said direction independently of the others to assure uniform clamping of said movable platens toward said fixed platen and the sealing of said cavity at said junctures regardless of deformation of said platens.

4. A press according to claim 1, said one platen and other platen comprising a movable platen and a fixed platen respectively, low power means for moving said carrier rapidly to and from said closed position, sensor means for sensing the distance that said carrier must be moved from said closed position to said next successive locking position when said carrier and movable platen are at said closed position and for activating said low power means to move said carrier to said next successive locking position independently of said movable platen at said closed position, thereby to provide a space between said carrier and said movable platen equal to said distance.

5. A press according to claim 4, spacer means carried by one of the two members comprising said carrier and movable platen and operative to span said space to prevent closing thereof during successive press operations, whereby said carrier will be located at said next successive locking position during said successive operations when said carrier and associated platen move to said closed position.

6. A press according to claim 5, control means associated with said sensor means and responsive to said movable platen at said closed position and to said carrier at said next successive locking position for actuating in sequence said locking means to lock said carrier at said next successive locking position, said force exerting means to force said movable platen toward said fixed platen and seal said mold cavity, and said means for injecting said chemicals into said sealed cavity.

7. A press according to claim 5, said spacer means comprising a plurality of rotatable spindles carried by said one member, a motor, torque limiting means connecting said motor and spindles for rotating the later about axes extending toward the other of said two members in the direction of movement of said carrier, an externally threaded spacer associated with each spindle and splined thereto for rotating therewith and for moving axially thereof, the external threads of said spacer being in screw threaded engagement with a portion fixed with respect to said one member to move said spacer axially along said spindle into and out of said space upon rotation of said spindle in one direction or the opposite, said torque limiting means enabling said spindle to stop rotating when said spacer spans said space and contacts said other member, and proximity switch means associated with each spacer for stopping said motor when all of said spacers contact said other member.

8. A press according to claim 4, sensor means responsive to deviations of said carrier from a reference plane and cooperable with said low power means for maintaining said carrier at a predetermined attitude with respect to said plane.

9. A press according to claim 1, said one and other platen comprising a movable platen and a fixed platen respectively, low power hydraulic means in an operative circuit for moving said carrier between said open and closed positions, and sensor means cooperable with said low power means and responsive to deviations of said carrier from a referenc plane for maintianing said carrier at a predetermined attitude with respect to said plane during said movement of said carrier.

10. A press according to claim 9, said press having a fixed base, said low power means comprising a pair of hydraulic cylinder and piston assemblies connecting said base and carrier adjacent to opposite edges of the latter, said sensor means comprising a pair of linear transducers supported by said base and extending longitudinally therefrom adjacent to said opposite edges respectively and in the direction of travel of said carrier from said closed to said open position, a pair of sensors associated with said transducers and hydraulic assemblies respectively and mounted on said carrier, each sensor being cooperative with its associated transducer to determine its position longitudinally of the associated transducer, and control means responsive to said longitudinal position of each sensor to control operation of the associated hydraulic assembly and maintain said predetermined attitude.

11. A press according to claim 3 and having a fixed base, said carrier having inner and outer surfaces proximate and remote from said base respectively, said cylinders being mounted on said outer surface.

12. A press according to claim 1 and having a fixed base, said one and other platen comprising a movable and a fixed platen respectively, said locking means comprise a plurality of locking rods secured to said base and extending therefrom at locations outwardly of the area of said mold in the direction of movement of said carrier from said closed position, each locking rod having a plurality of annular serrations along its length, a pair of dogs associated with each locking rod and mounted on said carrier for moving to and from locking engagement with opposite sides of the associated rod, said dogs having serrated recesses for receiving said opposite sides and mating and interlocking with the serrations of said rod at said locking engagement, an operative fluid actuated piston-cylinder assembly comprising a piston member and a cylinder member mounted on said carrier and reciprocal with respect to each other in opposite directions upon selective operation of said assembly, and means connecting said members with said dogs respectively for moving the latter simultaneously in said opposite directions with respect to each other to and from said locking engagement.

13. A high pressure press comprising a pair of platens movable with respect to each other between open and closed positions, each platen supporting at least one of multiple mold parts capable of interfitting when said platens are forced toward each other at said closed position to define a mold having a mold cavity sealed at the junctures of the interfitting mold parts, a carrier associated with one of said platens for moving therewith to said closed position, locking means for locking said carrier at a plurality of locking positions spaced incrementally from said closed position, said carrier also being movable to the next successive locking position independently of said one platen at said closed position, force exerting means mounted on said carrier for forcing said one platen toward the other platen when said platens are at said closed position and said carrier is locked at said next successive locking position, thereby to seal said cavity at said junctures, low pressure means for moving said carrier, and means for injecting molding chemicals into said sealed cavity, sensor means for sensing the distance that said carrier must be moved from said closed position to said next successive locking position when said carrier and movable platen are at said closed position and for activating said low power means to move said carrier to said next successive locking position independently of said movable platen at said closed position, thereby to provide a space between said carrier and said movable platen equal to said distance.

14. A press according to claim 13, spacer means carried by one of the two members comprising said carrier and movable platen and operative to span said space to prevent closing thereof during successive press operations, whereby said carrier will be located at said next successive locking position during said successive operations when said carrier and associated platen move to said closed position.

15. A press according to claim 14, control means associated with said sensor means and responsive to said movable platen at said closed position and to said carrier at said next successive locking position for actuating in sequence said locking means to lock said carrier at said next successive locking position, said force exerting means to force said movable platen toward said fixed platen and seal said mold cavity, and said means for injecting said chemicals into said sealed cavity.

16. A press according to claim 14, said spacer means comprising a plurality of rotatable spindles carried by said one member, motor means, torque limiting means connecting said motor means and spindles for rotating the latter about axes extending toward the other of said two members in the direction of movement of said carrier, an externally threaded spacer associated with each spindle and splined thereto for rotating therewith and for moving axially thereof, the external threads of said spacer being in screw threaded engagement with a portion fixed with respect to said one member to move said spacer axially along said spindle into and out of said space upon rotation of said spindle in one direction or the opposite, said torque limiting means enabling said spindle to stop rotating when said spacer spans said space and contacts said other member, and proximity switch means associated with each spacer for stopping said motor means when all of said spacers contact said other member.

17. A press according to claim 13, said sensor means being also responsive to deviations of said carrier from a reference plane and cooperable with said low power means for maintaining said carrier at a predetermined attitude with respect to said plane.

18. A press according to claim 13, said one and other platen comprising a movable platen and a fixed platen respectively, low power hydraulic means in an operative circuit for moving said carrier between said open and closed positions, and sensor means cooperable with said low power means and responsive to deviations of said carrier from a reference plane for maintaining said carrier at a predetermined attitude with respect to said plane during said movement of said carrier.

19. A press according to claim 18, said press having fixed support, said low power means comprising a pair of hydraulic cylinder and piston assemblies-36-connecting said support and carrier adjacent to opposite edges of the latter, said sensor means comprising a pair of linear transducers supported by said support and extending longitudinally therefrom adjacent to said opposite edges respectively and parallel to the directions of travel of said carrier, said sensor means comprising a pair of sensors associated with said transducers and hydraulic assemblies respectively and mounted on said carrier, each sensor being cooperative with its associated transducer to determine its position longitudinally of the associated transducer, and control means responsive to said longitudinal position of each sensor to control operation of the associated hydraulic assembly and maintain said predetermined attitude.

20. A method of operating a high pressue press having
(A) a pair of platens movable with respect to each other between open and closed positions, each platen supporting at least one of multiple mold parts capable of interfitting when said platens are forced toward each other at said closed positin to define a mold having a mold cavity sealed at the junctures of the interfiting mold parts,
(B) a carrier associated with one of said platens for moving therewith to said closed position,
(C) locking means for locking said carrier at a plurality of locking positions spaced incrementally from said closed position,
(D) force exerting means mounted on said carrier for forcing said one platen toward the other platen when said platens are at said closed position and said carrier is locked at said next successive locking position, and
(E) means for injecting molding chemicals into said sealed cavity,
The steps of sequentially
(1) moving said carrier and one platen to said closed position,
(2) moving said carrier to the next successive locking position independently of said one platen at said closed position,
(3) actuating said locking means to lock said carrier at said next successive locking position,
(4) actuating said force exerting means to effect said sealed mold cavity, then
(5) actuating said means for injecting aid chemicals into said sealed cavity.

21. A method according to claim 20, wherein said press also has
(F) low power means for moving said carrier rapidly to and from said closed position, and wherein step 1 includes activating said low power means to move said carrier and one platen to said closed position, and step 2 includes sensing the distance that said carrier must be moved from said closed position to said next successive locking position and then activating said low power means to move said carrier to said next successive locking position, independently of said movable platen at said closed position, to provide a space between said carrier and said movable platen equal to said distance.

22. A method according to claim 21, and following step 2, inserting a spacer into said space to prevent closing therof during successive press operations, whereby said carrier will be located at said next successive locking position during said successive operations when said carrier and associated platen move to said closed position.

23. A method according to claim 20, and also comprising the steps of sensing deviations of said carrier from a reference plane during movement of said carrier to and from said closed position, and using said deviations to restore said carrier to a predetermined attitude with respect to said plane during said movement.

24. A method according to claim 23, wherein said press also has a fixed support, and low power means comprising a pair of hydraulic cylinder and piston assemblies associated with opposite edges of said carrier and connecting said support and carrier adjacent to the associated edges, and wherein said steps of sensing said deviations comprise sensing the deviations of said opposite edges from said reference plane, and using the deviation associated with each edge to control the associated low power assembly to maintain said predetermined attitude.

* * * * *